Patented Oct. 13, 1942

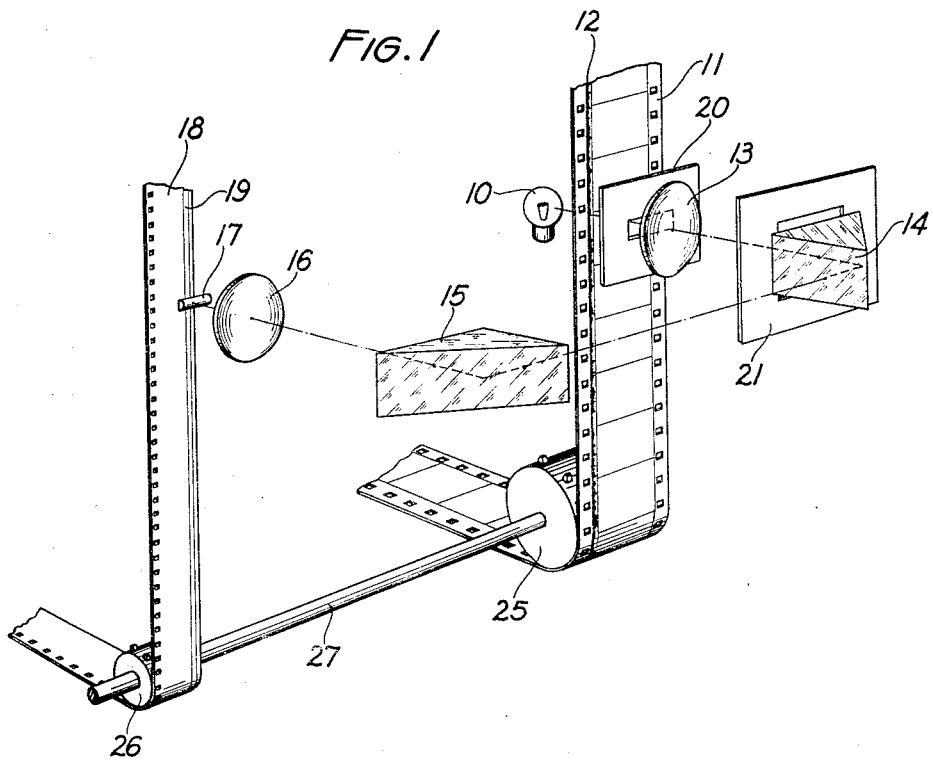
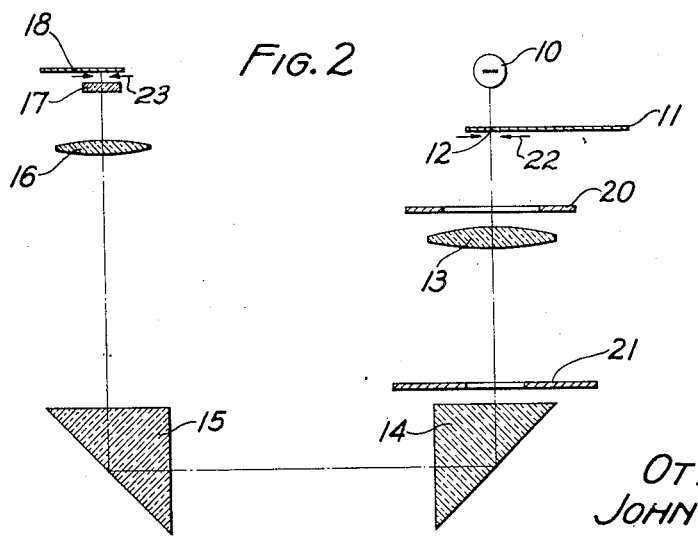

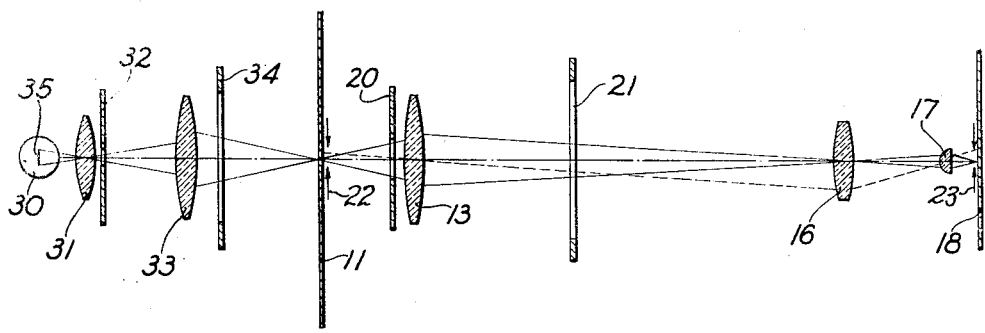
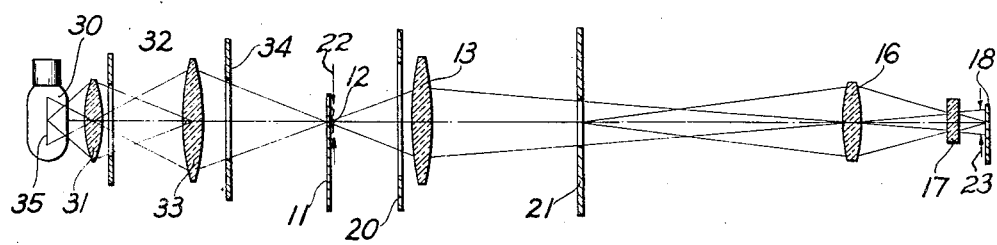
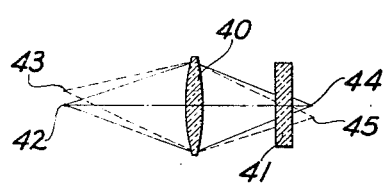
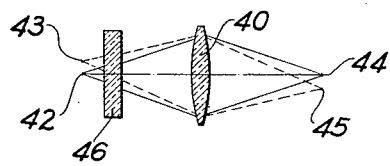
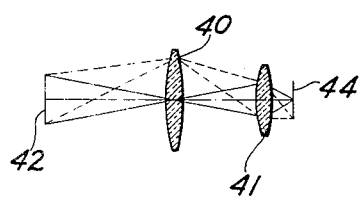
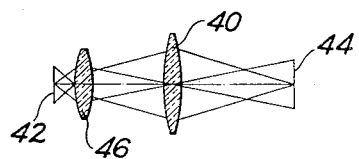

2,298,422

UNITED STATES PATENT OFFICE 2,298,422

SOUND PRINTER

Otto Sandvik and John H. McLeod, Rochester, N. Y., assignors to Eastman Kodak Company, Rochester, N. Y., a corporation of New Jersey Application July 25, 1939, Serial No. 286,419

12 Claims. (Cl. 88—24)

This invention relates to optical systems and particularly to optical systems for use in printing sound motion picture film.

It is the primary object of the invention to provide a sound printer for printing variable density sound records from variable width sound records. The advantages of variable density records are well known and the need for a satisfactory system for printing variable density records from variable width, sometimes called variable area, records has long been felt.

It is an object of one embodiment of the invention to provide such a sound printer in which the variable width record being copied is uniformly illuminated.

It is also an object of the invention to provide a so-called "slitless" optical system so that considerable length of the sound track, e. g., several times that occupied by one cycle of the highest recorded frequency, may be printed at one time. This provides illumination efficiency and hence the printing may be carried out at a high speed.

It is an object of the preferred embodiment of the invention to provide a wide aperture and efficient optical system for printing an undistorted variable density sound track from a variable width sound track.

It is a further object of the invention to provide such a system which is simple, relatively easy to manufacture and not too critical in its tolerance of adjustments.

According to the invention, the variable width sound track to be printed is illuminated and between this sound track and the sensitive film there is placed an optical system consisting of one or more spherical (or slight aspherical) refracting surfaces and one or more cylindrical refracting surfaces to project on the sensitive film an astigmatic image of the sound record which image is punctual longitudinally of the sound track. That is, each transverse line on the sound track is focused as a transverse line on the sensitive film but each point on this transverse line is spread out (diffused) over the transverse line on the sensitive film, i. e., each point of the sensitive film receives light from every point on a transverse line on the sound track. Broadly speaking, optical systems of this type are well known and as far as the broad invention here taught is concerned, no claim is made to the optical system per se. However, such systems have not been used in sound printers wherein they permit considerable length of sound track to be printed at one time and also provide an efficient system since the transverse diffusion in the sound track is substantially equal to the sound track width.

On the other hand, the preferred embodiment of the invention employs an optical system which is itself novel and which is particularly accurate, efficient, and free from distortion and other aberrations. This preferred system also permits the edges of the sound track on the sensitive film to be accurately defined by a diaphragm in the optical system at some distance from the film. This is obviously an advantage since it eliminates the need for any mask close to the film.

This preferred embodiment of the invention consists of some means of uniformly illuminating the variable width sound track to be printed and an optical system between the variable width sound track and the sensitive film for forming an astigmatic image on the sensitive film. The optical system consists of a collective lens, preferably a single element, in front of the variable width sound track for forming a real image thereof between the lens and the sensitive film. A second collective lens acting as a field-lens is placed at this image and focuses onto the sensitive film light from a point near or at the first lens which arrangement insures that the light reaching the film is completely out of focus. Between this second lens and the sensitive film and near to the sensitive film, a cylindrical lens is placed with its axis transverse to the sound track. The power of this cylindrical lens is such that the real image formed by the first collective lens in the second collective lens is re-imaged by the cylindrical lens onto the sensitive film. This image on the sensitive film is astigmatic and is punctual only longitudinally. Furthermore since the cylindrical lens has no effect transversely, the image is completely and exactly out of focus transversely.

Each lens of this system may be compound or merely a single element. For convenience throughout this specification and the accompanying claims, the films are considered to move vertically and the lines of the sound track are therefore horizontal. However, these terms are merely relative and the actual orientation of the apparatus in space is quite immaterial. In fact, the optical system may be arranged so that one of the films moves vertically and the other moves horizontally. Such a twisting of the optical system may be accomplished by using mirrors at oblique angles, but when the orientation of the optical units and images are considered relative to the optic axis at that unit or image, the terms horizontal and vertical refer equally well to such twisted arrangements.

By placing an aperture near the first collective lens and in the plane which is conjugate to the film with respect to the second collective lens, it is possible to define accurately the width of the sound track on the sensitive film. This eliminates the need for a mask at or very close to this sensitive film. The width of the aperture in the mask must be "optically equal" to the sound track, i. e., must be equal to the width of the sound track multiplied by the magnification factor of the second collective lens.

The invention and its objects and advantages will be more fully understood from the following description when read in connection with the accompanying drawings in which:

Fig. 1 is a perspective view of one embodiment of the invention.

Fig. 2 is a plan view of the embodiment shown in Fig. 1.

Fig. 3 is an elevation of a similar embodiment of the invention.

Fig. 4 is a plan of the embodiment shown in Fig. 3.

Figs. 5 to 8 illustrate less preferred embodiments of the invention using known optical systems, Figs. 5 and 7 being elevations and Figs. 6 and 8 being plan views.

In the arrangement shown in Figs. 1 and 2 a 35-mm. sound film 11 carrying a variable width track 12 is moved vertically downward by a sprocket 25 on a driven shaft 27. The sound track 12 is illuminated by a light source 10 and an astigmatic image of this sound track 12 is formed on a sensitive 16-mm. sound film 18 in the area indicated by the lines 19, which area is the portion of the sensitive film which is to receive the variable density sound track. This astigmatic image is formed by the collective lenses 13 and 16 and the cylindrical lens 17 adjacent to the film 18. For convenience the light is reflected by two totally reflecting prisms 14 and 15, but obviously a direct system may be alternatively used. The film 18 is driven by a sprocket 26 also mounted on the shaft 27. If the prisms are oriented at an angle of 45 degrees, the above-mentioned twisted arrangement may be provided wherein the sensitive film 18 moves at right angles to the film 11, but this is much less preferable.

This optical system shown in Figs. 1 and 2, including the lenses 13, 16 and 17 and two aperture masks 20 and 21 is best understood by reference to Figs. 3 and 4 in which a similar optical system, omitting the prisms 14 and 15, is used between the film 11 and the sensitive film 18. In this arrangement the collective lens 13 forms an image of the sound track 12 in the second collective lens 16. This image is re-focused by the cylindrical lens 17 onto the sensitive film 18 and is punctual longitudinally of this film 18. The collective lens 16 is of such power that with respect to this lens, the film 18 is conjugate to a plane at or near the lens 13. A diaphragm 21 is placed in this conjugate plane to define the width of the sound track on the sensitive film 18. This arrangement provides that every point on the sound track 12 is imaged as a horizontal straight line on the sensitive film 18. Furthermore, every point in this horizontal straight line on the sensitive film 18 receives light only from the corresponding horizontal line in the sound track 12. Thus, there is produced in the sound track 19 a variable density image corresponding exactly to the variable width image 12. The optical system is highly efficient since most of the light from every point on the sound track 12 is utilized forming the image 19. Furthermore, since the image formed is punctual longitudinally, several lines of the sound track 12 may be printed simultaneously. This is illustrated by the broken line appearing in Fig. 3 wherein a portion of the sound track 12 slightly above the optic axis is imaged correctly on the sensitive film 18. In this connection, lenses 13 and 17 should be approximately conjugate with respect to lens 16. Thus, diaphragm 21 to be conjugate to film 18 should be slightly spaced from lens 13 as shown.

The horizontal aperture of the system is defined by the aperture in the diaphragm 21 which determines accurately the width of the sound track 19. This is obvious from Fig. 4 which indicates how the edges of the aperture in the diaphragm 21 are horizontally focused on the film 18. The vertical aperture of the system is defined by a second diaphragm 20 placed near the collective lens 13. Obviously, neither of these aperture defining means are absolutely necessary to the invention, but in practice it is desirable to use some arrangement such as this.

In Figs. 1 and 2 the sound track 12 is illuminated directly by a light source 10. In Figs. 3 and 4 a more efficient and more satisfactory system for illuminating the sound track 12 is used consisting of a lamp 30 having an elongated filament 35, and two collective lenses 31 and 33 arranged to give exact and complete diffusion of the light on the sound track 12. That is, the collective lens 31 forms an image of the filament 35 in the lens 33 and the light which is completely unfocused in the lens 31 is focused by the lens 33 onto the film 11. A diaphragm 32 for defining the vertical aperture of the illuminating system is placed near the collective lens 31 and a second diaphragm 34 for defining the horizontal aperture of the system is placed near the lens 33. The aperture in the diaphragm 32 may be considered as the exit pupil of the lens 31, but the positioning is not at all critical and actually the diaphragm may be some distance from this exit pupil—just as the diaphragm 21 is some distance from the lens 13. Such a system eliminates the effect of any non-uniformity of the brightness of the filament 35 and permits considerable tolerance in adjustment of this filament whereby microphonics due to vibration of the filament are eliminated. Attention is drawn to the fact that a slight amount of care must be exercised to insure that the lens 13 is not so positioned that it refocuses the image of the filament which appears in the lens 33 into the aperture in the diaphragm 21 whereby it is refocused by the lens 15 onto the film 18. This is not very serious and is not liable to occur, but even if it does occur, it may be easily eliminated by selecting a slightly different power for the lens 16 and making corresponding adjustments such as moving the aperture 21 to a position to correspond to the change in power of this lens 16.

Thus the invention provides a slitless system and permits the printing of considerable length of sound track at one time while simultaneously changing from variable width to variable density. Although the actual printer may include no physical counterpart, the area at the sound track 12 which is "seen," i. e., imaged, by the optical system is called the sound gate and the area of the image formed by the optical system at the film 18 is called the printing gate. These sound and printing gates have widths substantially equal to their respective sound tracks and heights equal to more than twice that occupied by one cycle of the highest frequency records. In fact the gates are several times this height. The image formed in the printing gate is vertically punctual and horizontally diffused at least to the width of this gate.

These definitions of "sound gate" and "printing gate" correspond to the elements usually designated by these terms. Any apparent unusualness is due to the fact that in each case the definition is exact, careful and given in terms equally applicable to all the common forms of such gates. The sound gate can be accurately measured whether it is defined by masks limiting the area illuminated or by the entrance pupil of the optical system between the gates. Similarly, the printing gate can be measured by a ruller or more accurately by a travelling microscope. The gates are shown in the drawings by darts 22 and 23 for the sound and printing gates respectively. In each case, these darts are shown adjacent to the film for convenience of illustration. Of course, the actual gates are substantially at the surfaces of the films themselves, not separately therefrom even by the small distances required for clarity in the drawings. It will be noted, particularly in Figs. 3 and 4, that both the vertical and horizontal edges of the gates coincide with the limiting rays passing through the optical system.

Figs. 5 to 8 illustrate another embodiment of the invention; specifically they illustrate the optical system for focusing on the sensitive film 18 an astigmatic image of the sound track 12. In Figs. 5 and 6 which are respectively elevation and plan views, a horizontal line 42 on the sound track 12 is focused by a collective lens 40 as a horizontal line 44 on the sensitive film. Similarly, a second horizontal line 43 immediately above the line 42 is focused as a horizontal line 45 immediately below the line 44. The arrangement is shown for unit magnification but any magnification may be used. A cylindrical lens 41 arranged with its cylindrical axis vertical which is opposite to the arrangement of the cylindrical lens 17, is positioned so that the lens 40 is conjugate to the sensitive film. Thus the image 44 is an astigmatic image and is completely and exactly out of focus in a horizontal plane. Each point on the horizontal line 42 sends light to every point on the horizontal line 44 and each point on the horizontal line 44 receives light from every point on the horizontal line 42.

Simple combinations of spherical and cylindrical refracting surfaces to give astigmatic images are known and hence no claim is made to the optical system shown in the Figures 5 to 8. However sound printers including such a system have considerable advantage over other methods which have been tried for printing variable density sound tracks from variable width sound tracks.

Figs. 7 and 8 are similar to Figs. 5 and 6 but the arrangement is reversed by placing a cylindrical lens 46 near the original record rather than near the sensitive film. The arrangement shown in Figs. 5 to 8 require more critical positioning of the various lens elements than the preferred embodiment shown in Figs. 1 to 4 and are more liable to introduce distortion, but they have the added advantage of simplicity and employ fewer lenses.

Any of the embodiments of the invention are applicable to printing at unit magnification from 35-mm. to 35-mm. film or from 16-mm. to 16-mm. film. They are particularly useful in projection printers for printing 16-mm. sound film from 35-mm. sound film or vice versa. If in Fig. 3 the distance from film 11 to lens 13 is A, the distance from lens 13 to lens 16 is B, the distance from lens 16 to lens 17 is C and the distance from lens 17 to film 18 is D, then $$\frac{B \times D}{A \times C}$$

must equal unity if the system is used for printing 35-mm. from 35-mm. film or 16 mm. from 16 mm. film. That is $$\frac{B}{A} \text{ must equal } \frac{C}{D}$$

In a sound reduction printer for printing 16-mm. film from a 35-mm. original, the ratio $$\frac{B \times D}{A \times C}$$

must be substantially equal to .401 to conform with the standards generally adopted.

Having thus described several embodiments of our invention, we wish to point out that it is not limited to the specific arrangements but is of the scope of the appended claims.

What we claim and desire to secure by Letters Patent of the United States is:

1. A sound printer for printing a variable density sound track from a variable width sound track comprising a sound gate past which said variable width sound track may be vertically moved, a printing gate past which the portion of a sensitive film which is to receive said variable density sound track may be vertically moved, said sound and printing gates having horizontal widths substantially equal to those of their respective sound tracks and having heights greater than twice that occupied by one cycle of the highest frequency recorded in the sound tracks, means for illuminating the sound gate, an optical system between the sound and printing gates for focusing on the printing gate an astigmatic image of the sound gate, said optical system including a plurality of lenses at least one of which is a substantially spherical converging lens and at least one of which is cylindrical, said plurality of lenses being so arranged that said astigmatic image is vertically punctual and horizontally diffused at least to the width of the printing gate and means for moving the film synchronously past their respective gates.

2. An optical system for printing on a sensitive film a variable density sound track from a variable width sound track comprising a sound gate adjacent to and effectively coinciding with the variable width sound track, means for illuminating said sound gate, a printing gate adjacent to and effectively at the sensitive film, a series of lenses including spherical and cylindrical refracting surfaces for forming on the printing gate an astigmatic image of the sound gate which image is punctual longitudinally of the sound track and means for moving the films synchronously past the adjacent gates.

3. An optical system according to claim 2 in which said illuminating means comprises a lamp having an elongated filament, an objective having an exit pupil for forming a real image of said filament and a lens positioned at said real image of the filament for forming on the sound gate an image of said exit pupil.

4. An optical system for printing on a sensitive film a variable density sound track from a variable width sound track comprising means for illuminating the variable width sound track, a collective lens in front of the variable width sound track for forming a real image thereof between said lens and the sensitive film, a cylindrical lens with its cylindrical axis optically transverse to the sound track between said real image and the sensitive film for forming on the film an astigmatic image of said real image punctual longitudinally of the sound track and a second collective lens at said real image, the power of this second collective lens being such that with respect thereto the plane conjugate to the sensitive film is near the first-mentioned collective lens.

5. An optical system according to claim 4 in which each of the three lenses is a single element.

6. An optical system according to claim 4 in which said illuminating means comprises a lamp having an elongated filament, an objective having an exit pupil for forming a real image of said filament and a lens positioned at said real image of the filament for forming on the variable width sound track an image of said exit pupil.

7. An optical system according to claim 4 in which a diaphragm is placed in said conjugate plane which diaphragm has an aperture whose width is optically equal to the width of the variable density sound track on the sensitive film.

8. An optical system according to claim 4 specifically for printing at one to one magnification and having the ratio of the distance between said real image and the first collective lens to the distance between this lens and the variable width sound track equal to the ratio of the distance between said real image and the cylindrical lens to the distance between the cylindrical lens and the sensitive film.

9. An optical system according to claim 4 specifically for printing standard 16-mm. sound film from standard 35-mm. sound film and having the ratio $$\frac{B \times D}{A \times C}$$

substantially equal to .401 where A is the distance from the variable width sound track to the first collective lens, B is the distance from this lens to the real image, C is the distance from the real image to the cylindrical lens, and D is the distance from the cylindrical lens to the sensitive 16-mm. film.

10. A sound printer for printing a variable density sound track from a variable width sound track comprising a sound gate past which said variable width sound track may be vertically moved, a printing gate past which the portion of a sensitive film which is to receive said variable density sound record may be vertically moved, said sound and printing gates having horizontal widths substantially equal to those of their respective sound tracks and having heights greater than twice that occupied by one cycle of the highest frequency recorded in the sound tracks, means for illuminating the sound gate and an optical system consisting of a collective lens in front of the sound gate for forming a real image thereof between the lens and the printing gate, a cylindrical lens with its cylindrical axis horizontal between the real image and the printing gate for forming in the printing gate a vertically punctual astigmatic image of said real image and a second collective lens at said real image having such power that with respect thereto the plane conjugate to the printing gate is near the first-mentioned collective lens, and the plane conjugate to the cylindrical lens is at the first mentioned collective lens.

11. A sound printer according to claim 10 in which said illuminating means comprises a lamp having an elongated filament, an objective having an exit pupil for forming a real image of said filament and a lens positioned at said real image of the filament for forming on the variable width track an image of said exit pupil and in which said conjugate plane near the first collective lens is spaced from the plane conjugate to the real image of the filament with respect to the first-mentioned collective lens in front of the sound gate.

12. An optical system according to claim 4 in which the cylindrical lens is conjugate to the first-mentioned collective lens with respect to the second collective lens.

OTTO SANDVIK.
JOHN H. McLEOD.